(12) United States Patent
Hernandez Esteban et al.

(10) Patent No.: US 8,994,738 B1
(45) Date of Patent: Mar. 31, 2015

(54) SYSTEMS AND METHOD FOR NAVIGATING BETWEEN OBLIQUE VIEWS OF A MAP

(75) Inventors: Carlos Hernandez Esteban, Kirkland, WA (US); Steven Maxwell Seitz, Seattle, WA (US); Matthew Robert Simpson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 395 days.

(21) Appl. No.: 13/426,508

(22) Filed: Mar. 21, 2012

Related U.S. Application Data (60) Provisional application No. 61/543,276, filed on Oct. 4, 2011.

(51) Int. Cl.
*G06T 13/00* (2011.01)
(52) U.S. Cl.
USPC .......................................................... 345/475
(58) Field of Classification Search
CPC ................ G06F 3/04815; G06T 13/00; G06T 13/20–13/60; G06T 19/00–19/003
USPC ......................................................... 345/475
See application file for complete search history.

(56) References Cited

U.S. PATENT DOCUMENTS

| | | | |
|---|---|---|---|
| 5,276,785 A | 1/1994 | Mackinlay et al. | |
| 6,487,304 B1 * | 11/2002 | Szeliski | 382/107 |
| 7,831,089 B2 * | 11/2010 | Ofek et al. | 382/154 |
| 2004/0085335 A1 * | 5/2004 | Burlnyk et al. | 345/716 |
| 2009/0259976 A1 | 10/2009 | Varadhan et al. | |

* cited by examiner

*Primary Examiner* — Charles Tseng
(74) *Attorney, Agent, or Firm* — Lerner, David, Littenberg, Krumholz & Mentlik, LLP (57) ABSTRACT

System and method for rendering a sequence of images corresponding to a sequence of camera poses of a target area to generate an animation representative of a progression of camera poses are provided. An initial image and an associated initial depthmap of a target area captured from an initial camera pose, and a final image and an associated final depthmap of the target area captured from a final camera pose are identified. A plurality of intermediate images representing a plurality of intermediate camera poses directed at the target are produced by performing interpolation on the initial image, the initial depthmap, the final image and the final depthmap. Each intermediate image is associated with a point along the navigational path between the initial and the final camera poses. An animation of the plurality of intermediate images produces a transition of views between the initial camera pose and the final camera pose.

18 Claims, 9 Drawing Sheets

SYSTEMS AND METHOD FOR NAVIGATING BETWEEN OBLIQUE VIEWS OF A MAP

CROSS-REFERENCE TO RELATED APPLICATIONS

The present application claims the benefit of U.S. Provisional Patent Application Ser. No. 61/543,276, entitled "Systems and Method for Navigating Between Oblique Views of a Map," filed on Oct. 4, 2011, which is hereby incorporated by reference in its entirety for all purposes.

FIELD

The subject technology generally relates to an animated change in map imagery and its associated view orientations and, in particular, relates to systems and methods for rendering a sequence of image corresponding to camera poses to generate the animation in mapping applications.

BACKGROUND

Mapping applications may provide oblique aerial view images of points of interest from a variety of different headings. Mapping applications may also provide, in response to a user command (e.g., a mouse click, a keystroke, etc.), a transition between two oblique aerial view images of a target area with different headings. However, transitioning between the two oblique aerial view images of two different headings in consecutive frames may create a jarring and unpleasant user experience, and may cause a user to lose spatial context of the map viewed.

SUMMARY

The disclosed subject matter relates to a machine-implemented method for rendering a sequence of images corresponding to a sequence of camera poses of a target area to generate an animation representative of a progression of camera poses along a navigational path are provided. An initial image and an associated initial depthmap of a target area captured from an initial camera pose are identified. A final image and an associated final depthmap of the target area captured from a final camera pose are further identified. Several intermediate images representing several intermediate camera poses directed at the target are produced by performing interpolation on the initial image, the initial depthmap, the final image and the final depthmap. Each intermediate image is associated with a point along the navigational path between the initial camera pose and the final camera pose. An animation of the several intermediate images produces a transition of views between the initial camera pose and the final camera pose.

According to various aspects of the subject technology, a system including one or more processors and a machine-readable medium including instructions stored therein, which when executed by the processors, cause the processors to render a sequence of images corresponding to a sequence of camera poses of a target area. An initial oblique view image and an associated initial depthmap of a target area corresponding to an initial camera pose are received. A final oblique view image and an associated final depthmap of the target area corresponding to a final camera pose is further received, where the initial camera pose is different from the final camera pose. Several intermediate images corresponding to several intermediate camera poses of the target area are produced by performing interpolation on the initial oblique view image, the initial depthmap, the final oblique view image, and the final depthmap. Each of the several camera poses represents a heading angle along a navigational path between a heading angle associated with the initial camera pose and a heading angle associated with the final camera pose. An animation of the several intermediate images produces a transition of views between the initial camera pose and the final camera pose.

The disclosed subject matter also relates to a machine-readable medium including instructions stored therein, which when executed by a system, cause the system to perform operations including rendering a sequence of images corresponding to a sequence of camera poses of a target area. A first oblique view image corresponding to an initial camera pose of a target location and a first depthmap associated with the first oblique view are received. The depthmap includes several pixels, and each pixel includes a depth value. A second oblique view image corresponding to a final camera pose of the target location and a second depthmap associated with the second oblique view are received. The depthmap includes several pixels, each pixel includes a depth value. The second oblique view image has a different heading from the first oblique view image. Several intermediate images corresponding to several intermediate camera poses of the target area are produced by: rendering a first intermediate image based on the received first oblique view image and the first depth map; rendering a second intermediate image based on the received second oblique view image and the second depth map; and blending the first intermediate image and second intermediate image by assigning a first opacity to the first intermediate image and a second opacity to the second intermediate image, and combining the two images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art, that the subject technology may be practiced without some of these specific details. In other instances, well-known structures and techniques have not been shown in detail so as not to obscure the subject technology.

According to various aspects of the subject technology, a method is provided for rendering a sequence of images corresponding to a sequence of camera poses of a target area to generate an animation representative of a progression of camera poses along a navigational path are provided. An initial image and an associated initial depthmap of a target area captured from an initial camera pose are identified. A final image and an associated final depthmap of the target area captured from a final camera pose are further identified. Several intermediate images representing several intermediate camera poses directed at the target are produced by performing interpolation on the initial image, the initial depthmap, the final image and the final depthmap. Each intermediate image is associated with a point along the navigational path between the initial camera pose and the final camera pose. An animation of the several intermediate images produces a transition of views between the initial camera pose and the final camera pose.

Figure 1:
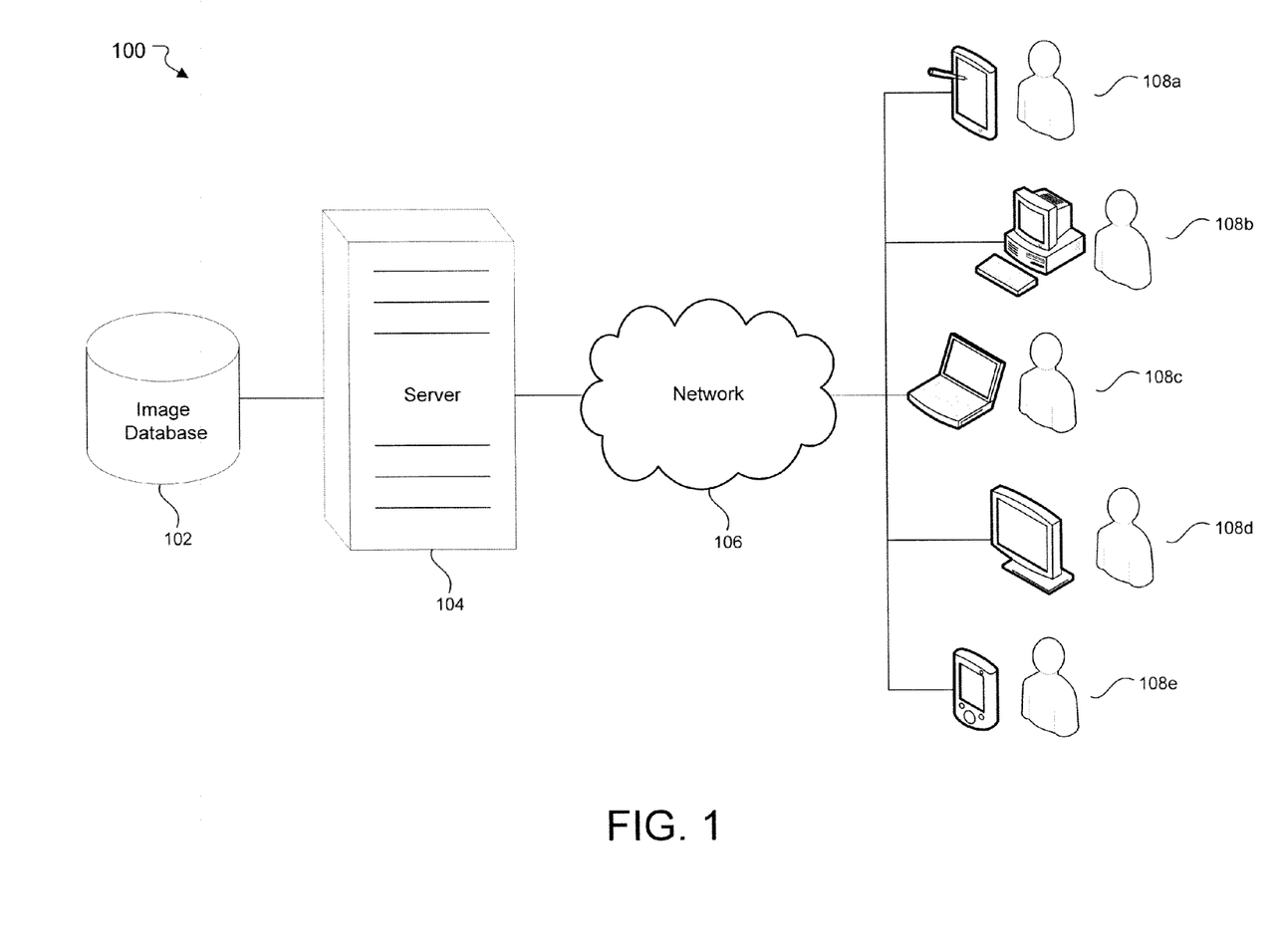
FIG. 1 illustrates an example of a system for serving/retrieving image data utilized to generate animations that represent transitions between different viewing orientations, in accordance with various aspects of the subject technology.

Network environment 100 comprises one or more databases 102 (e.g., computer-readable storage devices) for storing a plurality of images associated with a plurality of target areas, and for storing a plurality of depthmaps corresponding to the images. The stored images may include a plurality of oblique aerial images captured from a variety of different directional headings. The stored depthmaps may be associated with images to provide renderings of different viewing headings.

The network environment 100 further comprises one or more servers 104. Server 104 may receive requests from user-operated client devices 108a-108e. Server 104 and client devices 108a-108e may be communicatively coupled through a network 106. Client devices 108a-108e may request data from server 104. Upon receiving the request, server 104 may retrieve a set of associated images and depthmaps from image database 102 and serve the set of associated images to client devices 108a-108e. In some implementations, client devices 108a-e process the images provided from image database 102 through the server 104 to generate the animation. In some implementations, certain computations may be performed on server 104, and the processed image information served to client devices 108.

Each of client devices 108a-108e can represent various forms of processing devices. Example processing devices can include a desktop computer, a laptop computer, a handheld computer, a television with one or more processors attached or coupled thereto, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
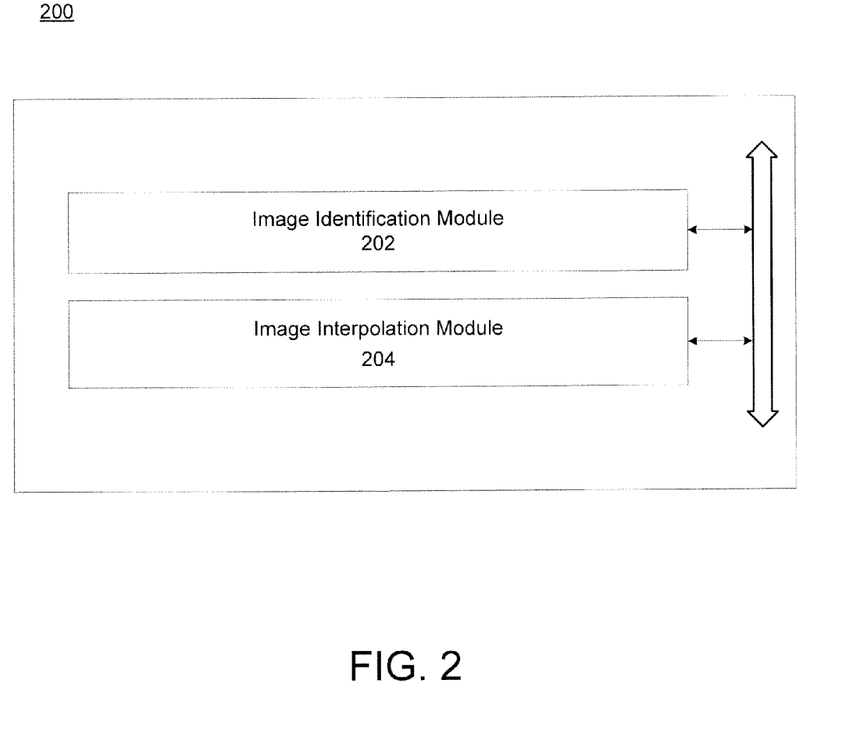
FIG. 2 illustrates an example of a system for generating images used in animating the transition between different viewing orientations, in accordance with various aspects of the subject technology.

FIG. 2 illustrates an example of a system utilized for generating the animation, in accordance with various aspects of the subject technology. System 200 includes image identification module 202 and image interpolation module 204. These modules may be in communication with one another. Image identification module 202 may identify images and associated depthmaps of target area 406 retrieved from image database 102 and received through server 104. Image identification module may also identify images and depthmaps necessary to generate the animation representative of a progression of camera poses along a navigational path. Image interpolation module 204 utilizes the identified images and depthmaps to generate mesh models that provide certain 3D information. Image interpolation module 204 renders the intermediate images for the animation based on the generated mesh models. In some aspects, the modules may be implemented in software (e.g., subroutines and code). The software implementation of the modules may operate on web browsers that generates interactive 3D graphics (e.g., by using Web-based Graphics Library, Cascading Style Sheets animation, etc.) running on client devices 108. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
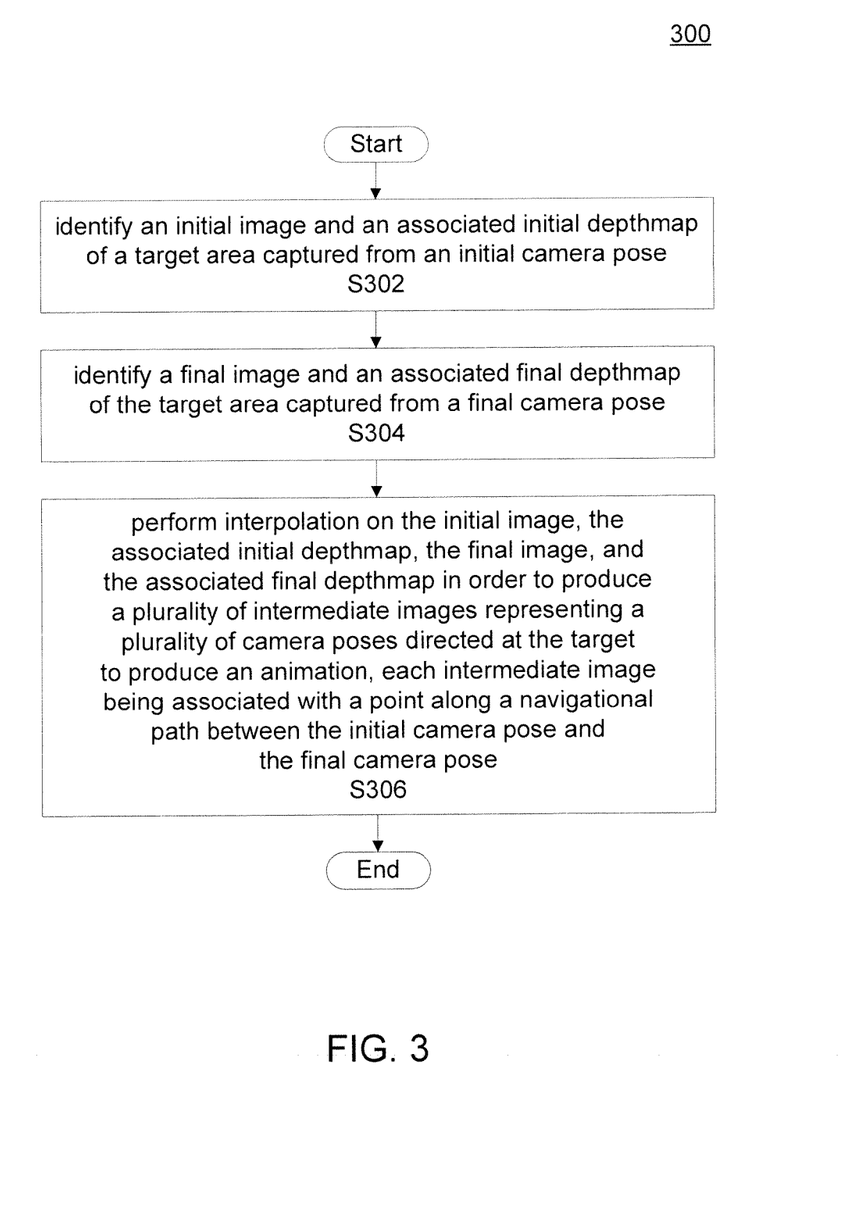
FIG. 3 illustrates an example of a method for generating an animation of a transition between different viewing orientations, in accordance with various aspects of the subject technology.
Figure 4:
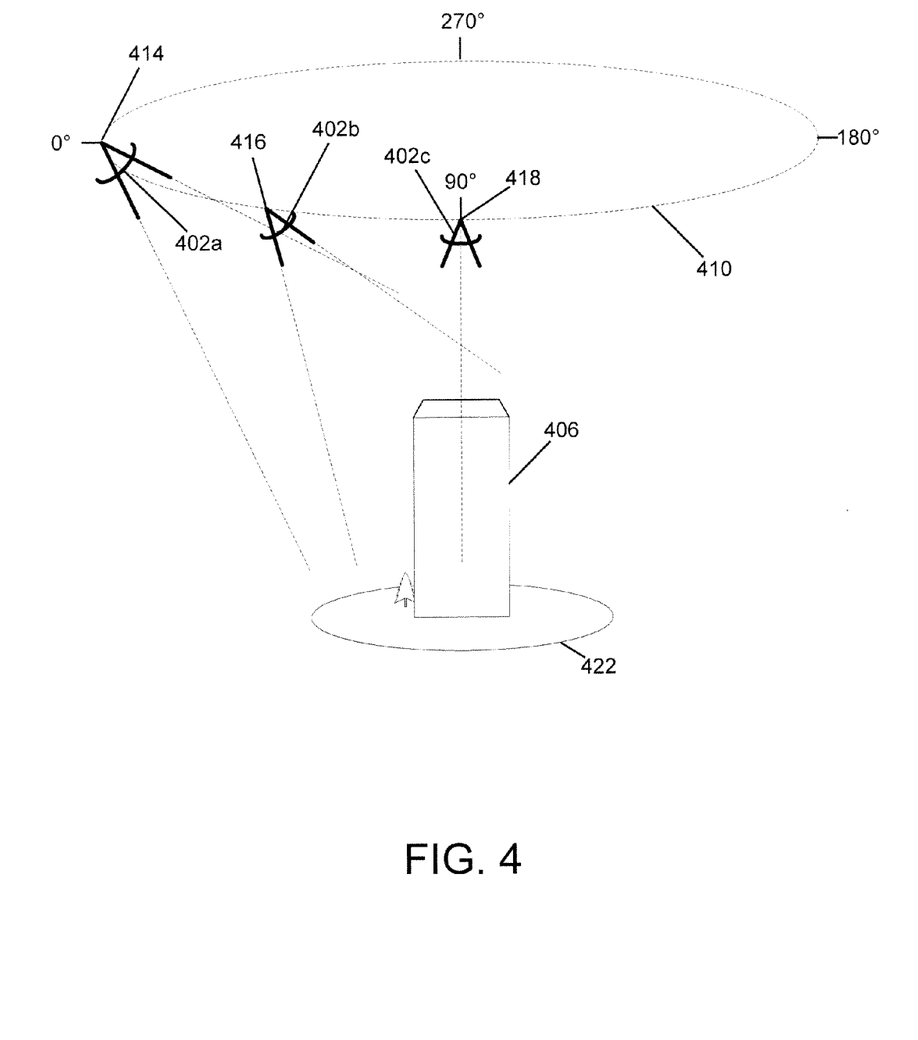
FIG. 4 provides a graphical representation of camera poses for which an animation is generated, in accordance with various aspects of the subject technology.

FIG. 3 illustrates an example of method 300 for generating an animation representative of a progression of camera poses along a navigational path, in accordance with various aspects of the subject technology. FIG. 4 provides a graphical representation of camera poses 402a-402c for which the animation may be generated. While FIG. 4 illustrates an example that includes three camera poses, numerous additional camera poses along the navigational path may be represented in the animation. Camera poses 402a-402c are illustrated as progressing along navigational path 410 between two discrete views. For example, FIG. 4 illustrates a progression from the first oblique aerial view at the first heading (e.g., at position 414) to the second oblique aerial view at the second heading (e.g., at position 418) while maintaining a view of target area 406, in accordance with various aspects of the subject technology. In this exemplary implementation, the first and second headings are separated by 90°. In some implementations, the separation between first and second heading may be a value greater than or less than 90°. Furthermore, the two discrete views may be from different elevations (i.e., different viewing angles).

Target area 406 may be a point of interest in a mapping application. For example, target area 406 may include a 3D landmark that a user may want to see from different angles. Thus, the user may select an alternate heading from which to view the target area 406 in the mapping application. For example, the landmark may be viewed at the second oblique aerial position 418 in order to better appreciate 3D characteristics of the landmark. Method 300 may be used to render a plurality of images representing a plurality of camera poses (e.g., 402a-402c) between the first oblique aerial view at the first heading 414 and the second oblique aerial view at the second heading 418, as described in further detail by reference to FIG. 6.

Figure 5A:
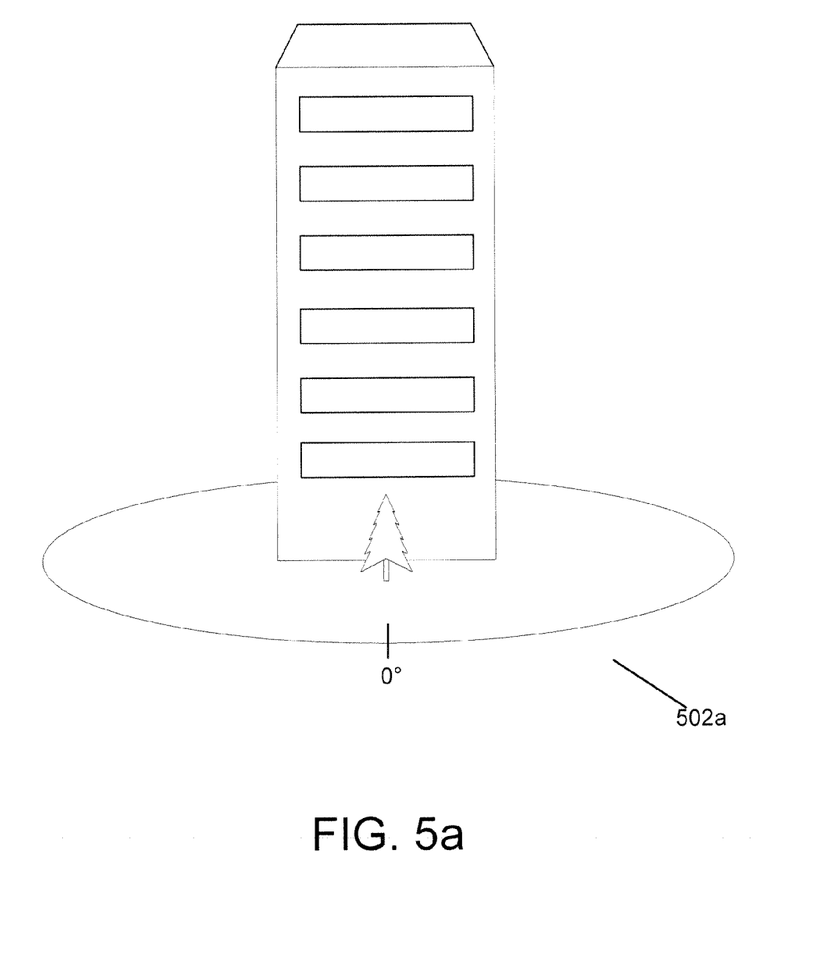
FIGS. 5a-5c illustrate example images of a target area corresponding to multiple camera poses along a navigational path, in accordance with various aspects of the subject technology.
Figure 5B:
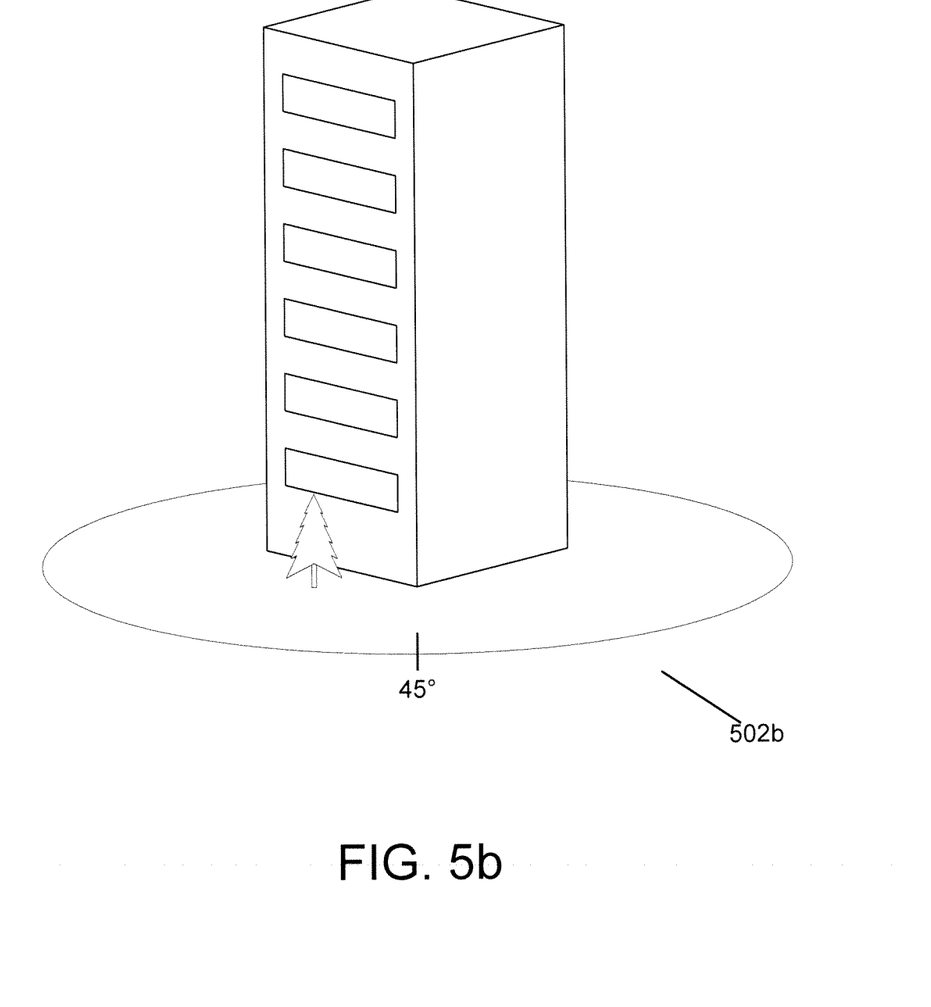
Figure 5C:
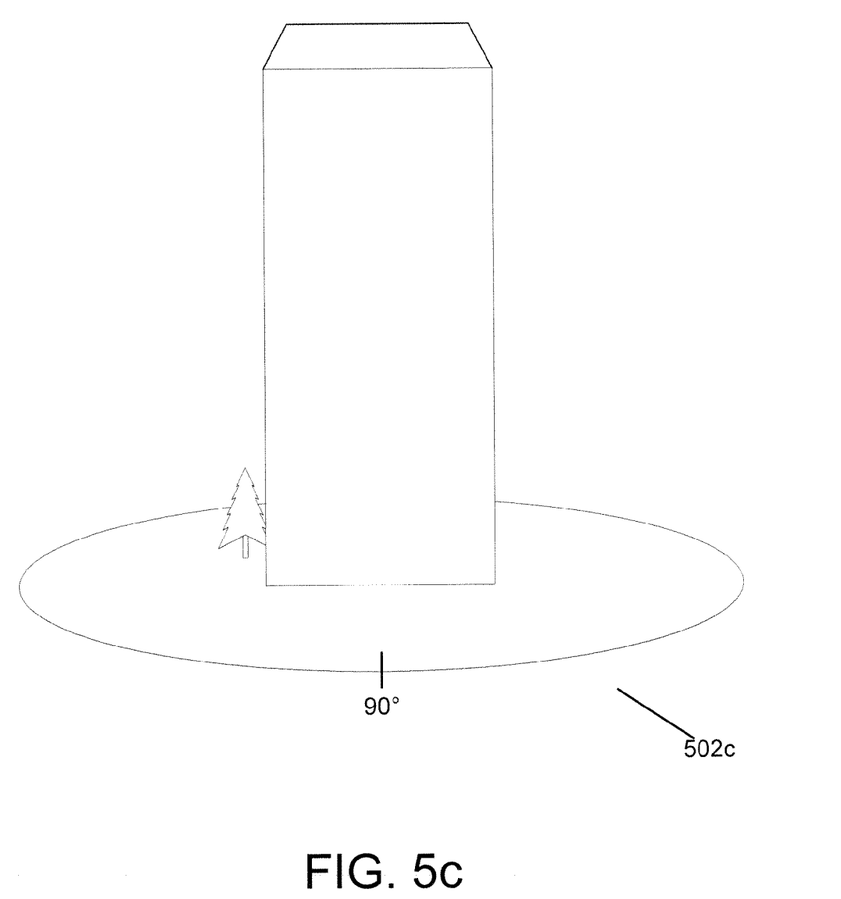

Returning to FIGS. 2 and 3, image identification module 202 may, upon receiving a user command to transition from an oblique aerial view of a first heading to an oblique aerial view of a second heading, identify the initial image and an associated initial depthmap of target area 406 corresponding to an initial camera pose, according to S302. FIGS. 5a-5c illustrate example images of target area 406 at various stages of the animation. The example images correspond to camera poses 402a-402c and depict a progression along navigational path 410, in accordance with various aspects of the subject technology. While FIG. 5 provides only three example images of the animation, numerous additional images may be rendered to improve the quality of the animation.

As shown in FIGS. 4 and 5a, initial image 502a represents an image corresponding to the first oblique aerial view at the first heading 414. That is, initial image 502a of target area 406 may represent the initial camera pose. The initial image 502a may represent an initial orientation corresponding to camera pose 402a at the initial camera pose. The initial orientation may comprise at least one of an initial tilt angle of the image and an initial heading of the image. In some implementations, such as the one shown in FIG. 4, an initial image in the initial camera pose 402a may be at position 414. Initial camera pose 402a (e.g., the first oblique aerial view at the first heading), may also have an associated heading of 0°, as shown in FIG. 4. In some implementations, the initial camera pose may also have a tilt of 45° with respect to a normal to surface 422 of the Earth to provide an aerial view of surface 422 and of target area 406. Numerous additional positions, headings and tilts may be used to provide different views of the target area from which the transition may begin or end. For example, the transition may be performed between any two headings having any two tilts.

Returning to FIGS. 2 and 3, image identification module 202 may identify a final image and an associated final depthmap of target area 406 captured from a final camera pose (i.e., the second oblique aerial view at the first heading), according to S304. FIGS. 5a-5c illustrate example images of target area 406 at various stages of the animation. The example images correspond to camera poses 402a-402c and depict a progression along navigational path 410, in accordance with various aspects of the subject technology. While FIG. 5 provides only three example images of the animation, numerous additional images may be rendered to generate a better quality animation. As shown in FIGS. 4 and 5c, final image 502c represents an image corresponding to the second oblique aerial view at the second heading 418, which is associated with a final camera pose of camera 402. That is, final image 502c of target area 406 represents camera 402 at the final camera pose.

The final image 502c may represent a final orientation corresponding to camera pose 402c. The final orientation may comprise at least one of a final tilt angle of the image and a final heading of the image. In some implementations, such as the one shown in FIG. 4, a final image in the final camera pose may be at position 418. This final camera pose (e.g., the second oblique aerial view at the second heading) may have an associated heading of 90°, as shown in FIG. 4. In some implementations, the final camera pose may also have a tilt of 45° with respect to a normal to surface 422 of the Earth to provide an aerial view of surface 422 and of target area 406. Numerous additional positions, headings and tilts may be used to provide different views of the target area from which the transition may begin or end. For example, the transition may be performed between any two headings having any variety of tilt.

As shown in FIGS. 5a-5c, the tilt may be maintained at 45° from the initial camera pose to the final camera pose in some implementations; however, the heading of each of the different camera poses may change to provide alternate views of the target area 406. In final image 502c, the oblique aerial view is shown to be at heading 90° East. Thus the heading of the final image 502c is 90° from the heading of the first image 502a. FIGS. 5a-5c indicate that the navigational path of the animation proceeds from a heading of 0° of the initial image to final image heading of 90° of the final image. In some implementations, the animation may proceed from heading different that those presented in the example. For example, the animation may proceed from a heading of 30° to a heading of 75°.

According to certain aspects, a plurality of intermediate images representing a plurality of intermediate camera poses directed at the target area may be rendered. Each of the intermediate images may represent a pose between the initial camera pose and the final camera pose. According to S306, image interpolation module 204 may render a plurality of intermediate images that represents camera poses (e.g., 402a-402c) progressing along navigational path 410 between the initial camera pose and the final camera pose. Each of the plurality of intermediate images may comprise at least one of an intermediate position (e.g., positions 416 in FIG. 4) and an intermediate orientation.

In some aspects, the intermediate image 502b may represent an intermediate orientation of camera 402. The intermediate orientation may comprise at least one of an intermediate tilt angle of the image and an intermediate heading of the image. For example, intermediate image 502b may be rendered for the intermediate camera pose at position 416 shown in FIG. 4. For each intermediate camera pose, the heading may be between the heading of the initial image (i.e., 0° North) and the final image (i.e., 90° East). Thus, each intermediate camera image may provide an oblique aerial view of target area 406 at a heading between 0° North and 90° East. The tilt for each intermediate camera pose may be maintained at 45° with respect to a normal to surface 422 of the Earth in some implementations. However, any variety of tilt angles may be used throughout the transition. Furthermore, while the above example only describes transitioning between 0° and 90°, the same transition may be applied between any variety of different initial and final headings.

Figure 6:
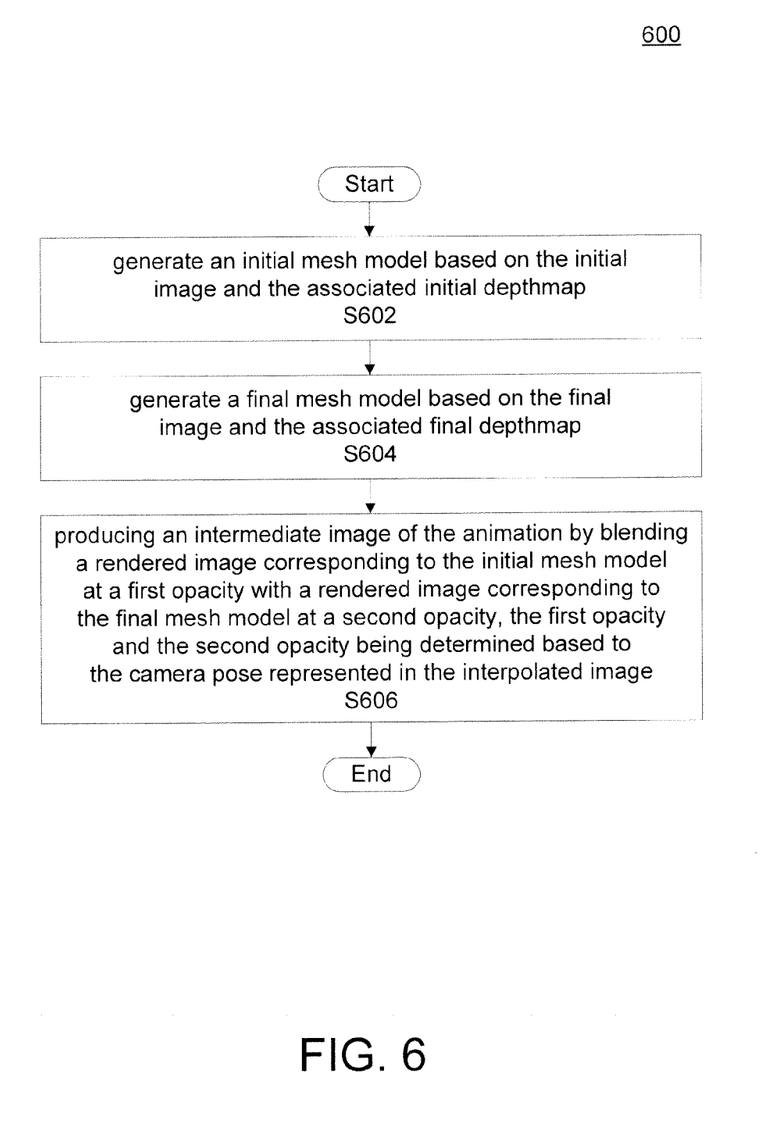
FIG. 6 illustrates an example of a method for performing an interpolation to produce images used in animating the transition between different views.

FIG. 6 illustrates an example of method 600 for producing the plurality of intermediate images that may provide a view of a transition from the first oblique aerial view at the first heading to the second oblique aerial view at the second heading, in accordance with various aspects of the subject technology. The plurality of intermediate images corresponding to the plurality of intermediate camera poses may be rendered such that each subsequent one of the plurality of intermediate images provides an image that more closely represents final image 512c than does a previous one of the plurality of intermediate images. As shown in FIG. 5, the intermediate camera pose after the initial camera pose may be rendered such that intermediate image 512b is closer to final image 512c than is initial image 512a. Similarly, additional subsequent intermediate camera poses may be rendered such that each subsequent intermediate image is closer to final image 512c than is intermediate image 512b.

The initial and final images, and the associated initial and final depthmaps identified by image identification module 202 may be used by image interpolation module 204 to render an initial 3D mesh model of the target area in S602 and to render a final 3D mesh model of the target area in S604. The initial depthmap may provide depth information of the target area 406 from the camera pose at which the initial image was captured. The final depthmap may provide depth information of the target area 406 from the camera pose at which the final image was captured. Accordingly, the 3D mesh model generated from the initial depthmap is most accurate when viewed from the heading of the initial image, and the 3D mesh model generated from the final depthmap is most accurate when viewed from the heading of the final image.

Once the mesh models are rendered, image interpolation module 204 may render, for each rendered camera pose, a first intermediate image based on the first mesh model and a second intermediate image based on the second mesh model. Image interpolation module 204 blends the first and second intermediate images by assigning a first opacity to the first intermediate image and a second opacity to the second intermediate image, and combining the two images. The first opacity and the second opacity are determined based on the camera pose represented in the rendered image such that the closer the camera pose is to the initial camera pose, the higher the first opacity will be set, and the lower the second opacity will be set. Conversely, the closer the camera pose represented in the rendered image is to the final camera pose, the lower the first opacity will be set, and the higher the second opacity will be set.

By blending the intermediate images with varying opacities, the image interpolation module 204 may favor the information from the initial image over the final image when the rendered image represents a camera pose closer to the initial camera pose, and the image interpolation module 204 will favor the information from the final image over the initial image when the rendered image represents a camera pose closer to the final camera pose. Accordingly, as the animation of camera poses 402a-402c progress along navigational path 410 from the initial camera pose to the final camera pose, the first and second opacities are crossfaded with one another (e.g., the first opacity will transition from 100% to 0% and the second opacity will transition from 0% to 100% as the animation progresses from the initial camera pose to the final camera pose). In some aspects, the crossfade of the first and second opacities may be linear with respect to the progression of the animation along the navigational path; however, in other aspects, the crossfade of opacities may be set to be non-linear.

In addition to the foregoing descriptions, the plurality of intermediate images may be rendered such that the intermediate images are at a same tilt angle (i.e., 45°) between initial image 512a and final image 512c. Furthermore, the plurality of intermediate images may be rendered such that each of the plurality of intermediate images remains centered around an initial point in space of target area 406. In some aspects, the initial point may be determined to be at a location of a cursor on the mapping application at the onset of the transition from the first oblique aerial view at the first heading to the second oblique aerial view at the second heading. For example, if the transition between views is initiated when the cursor is positioned over a landmark of the map in the initial view, the final view of the transition may be positioned such that the landmark is in the same position with relation to the cursor.

In some aspects, the rate at which the animation is rendered may be optimized to enhance the user's experience. In certain instances, rendering the animation too quickly (i.e., transitioning over a short timeframe) may result in an abrupt and unpleasant user experience. On the other hand, rendering the animation too slowly (i.e., transition over a long timeframe) may be time consuming and may delay the user from viewing target area 406 from the oblique aerial view. According to certain aspects, the rendering of the animation may be controlled by a predefined timing function. For example, an ease-in/ease-out timing function (e.g., Bezier timing function) may accelerate the progress along the navigational path through the middle of the transition. That is, the timing function may cause images generated during the beginning and end portions of the timeframe of the transition to represent slower progress along the navigational path than images generated during the middle of the timeframe. In some aspects, a timing function may be used to accelerate the rate of progression along the navigational path in areas where the transition is likely to produce artifacts from the rendering (e.g., at the middle section of the navigational path). Other timing functions, including linear timing curves and other non-linear timing functions, may be used to further enhance the user experience with transitions between the initial camera pose and the final camera pose.

In some aspects, the timing function may be assigned a fixed duration (e.g., 700 milliseconds) over which the transition is performed. The number of frames rendered during this fixed duration depends on the graphical processing speed of client device 108. For example, if client device 108 has the capability of rendering 30 frames per second, then 10 frames may be produced over the transition of 300 milliseconds. If client device 108 renders less than 30 frames per second, then fewer frames are produced over the duration of the transition. Conversely, if client device 108 can render more than 30 frames per second, then more frames may be produced over the duration of the transition. The timing function may provide information that indicates which orientation of the intermediate image to generate at a given point of the timeframe.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 7:
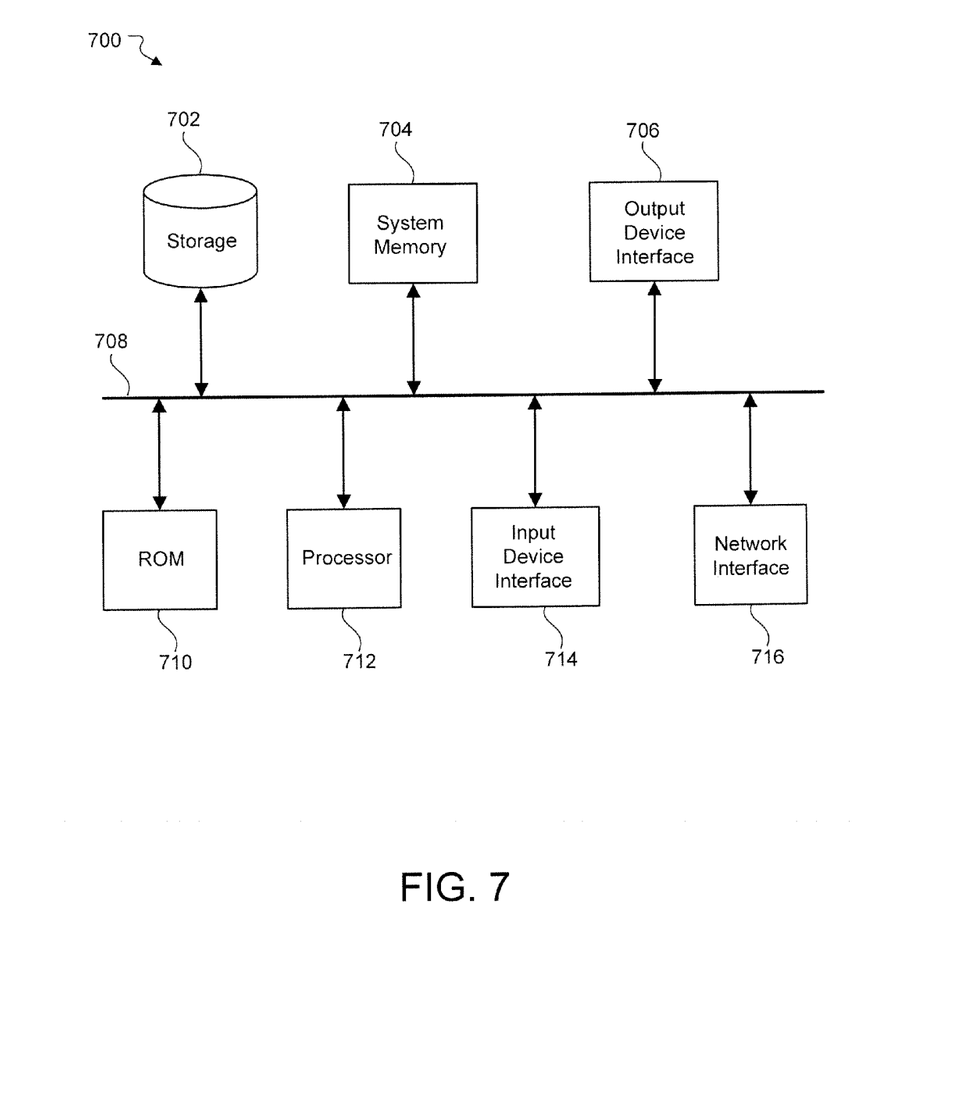
FIG. 7 is a block diagram that illustrates components of a controller, in accordance with various aspects of the subject disclosure.

FIG. 7 conceptually illustrates an example electronic system with which some implementations of the subject technology are implemented. Electronic system 700 can be a computer, phone, PDA, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for rendering a sequence of image corresponding to camera poses to generate an animation in mapping applications in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interface 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers, such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method of rendering a sequence of images corresponding to a sequence of camera poses of a target area to generate an animation representative of a progression of camera poses along a navigational path, the method comprising:
    identifying, with one or more processors, an initial image and an associated initial depthmap of a target area captured from an initial camera pose;
    identifying, with the one or more processors, a final image and an associated final depthmap of the target area captured from a final camera pose;

rendering, with the one or more processors, an initial mesh model based on the initial image and the initial depthmap; and rendering, with the one or more processors, a final mesh model based on the final image and the final depthmap, performing, with the one or more processors, interpolation on the initial image, the initial depthmap, the final image and the final depthmap in order to produce a plurality of intermediate images representing a plurality of intermediate camera poses directed at the target, each intermediate image being associated with a point along the navigational path between the initial camera pose and the final camera pose, wherein an animation of the plurality of intermediate images produces a transition of views between the initial camera pose and the final camera pose, and wherein producing the plurality of intermediate images comprises:

rendering a first intermediate image based on the initial mesh model;

rendering a second intermediate image based on the final mesh model; and blending the first intermediate image and second intermediate image by assigning a first opacity to the first intermediate image and a second opacity to the second intermediate image, and combining the first intermediate image and the second intermediate image.

2. The machine-implemented method of claim 1, wherein depthmaps associated with the initial image and the final image comprise a plurality of pixels, and wherein each pixel of each depthmap comprises a depth value associated with the respective initial image or final image.

3. The machine-implemented method of claim 1, wherein the identified initial image and the identified final image are oblique view images representing views at a same angle to the surface plane of the target location, wherein the same angle is greater than 0° and less than 90°.

4. The machine-implemented method of claim 3, wherein each of the plurality of intermediate images corresponds to an intermediate camera pose of a specific heading angle, and wherein each of the plurality of intermediate images represents a view at a same angle to the surface plane as the initial image and the final image.

5. The machine-implemented method of claim 1, wherein the animation comprises providing for display each of the plurality of intermediate images in an order according to a progression of heading angles of the plurality of intermediate images.

6. The machine-implemented method of claim 5, wherein the progression of angles progresses from a heading angle associated with the initial image to a heading angle associated with the final image.

7. The machine-implemented method of claim 5, wherein the progression of angles progresses from a heading angle associated with the final image to a heading angle associated with the initial image.

8. The machine-implemented method of claim 1, further comprising applying a timing function to control the production of each of the plurality of intermediate images by determining a corresponding camera pose heading angle for each intermediate image to be produced.

9. A non-transitory machine-readable medium comprising instructions stored therein, which when executed by a system, cause the system to perform operations comprising:

receiving a first oblique view image corresponding to an initial camera pose of a target location;

receiving a first depthmap associated with the first oblique view, wherein the depthmap comprises a plurality of pixels, each pixel comprising a depth value associated with the first oblique view image;

receiving a second oblique view image corresponding to a final camera pose of the target location, the second oblique view image having a different heading from the first oblique view image;

receiving a second depthmap associated with the second oblique view, wherein the depthmap comprises a plurality of pixels, each pixel comprising a depth value associated with the second oblique view image; and producing a plurality of intermediate images corresponding to a plurality of intermediate camera poses of the target area by:

rendering a first intermediate image based on the received first oblique view image and the first depth map;

rendering a second intermediate image based on the received second oblique view image and the second depth map; and blending the first intermediate image and second intermediate image by assigning a first opacity to the first intermediate image and a second opacity to the second intermediate image, and combining the first intermediate image and the second intermediate image.

10. The non-transitory machine-readable medium of claim 9, wherein the received first oblique view image and the received second oblique view image represent a view at a 45° angle to a surface plane of the target location.

11. The non-transitory machine-readable medium of claim 10, wherein the plurality of intermediate images represents a view at a 45° angle to a surface plane of the target location.

12. The non-transitory machine-readable medium of claim 9, wherein the first and second opacities are determined based on the specific heading angle of the corresponding camera pose.

13. The non-transitory machine-readable medium of claim 9, wherein a change in the first opacity is negatively correlated to a change in the second opacity through a progression of the plurality of intermediate images.

14. The non-transitory machine-readable medium of claim 13, wherein an intermediate image with a heading angle closer to a heading angle of the first oblique view image will have a higher first opacity and a lower second opacity than a first opacity and a second opacity of an intermediate image with a heading angle closer to a heading angle of the second oblique view image.

15. The non-transitory machine-readable medium of claim 9, wherein an animation of the plurality of camera poses produces a transition of views between the initial camera pose and the final camera pose.

16. The non-transitory machine-readable medium of claim 9, further comprising applying a timing function to control the production of each of the plurality of intermediate images by determining a corresponding camera pose heading angle for each intermediate image to be produced.

17. A system for generating a sequence of images corresponding to a sequence of camera poses of a target area to generate an animation representative of a progression of camera poses along a navigational path, the system comprising:

one or more processors; and a machine-readable medium comprising instructions stored therein, which when executed by the one or more processors, cause the one or more processors to perform operations comprising:

receiving an initial oblique view image and an associated initial depthmap of a target area corresponding to an initial camera pose;

receiving a final oblique view image and an associated final depthmap of the target area corresponding to a final camera pose, wherein the initial camera pose is different from the final camera pose; and rendering an initial mesh model based on the initial image and the initial depthmap; and rendering a final mesh model based on the final image and the final depthmap, performing interpolation on the initial oblique view image, the initial depthmap, the final oblique view image, and the final depthmap in order to produce a plurality of intermediate images corresponding to a plurality of intermediate camera poses of the target area, each of the plurality of camera poses representing a heading angle along a navigational path between a heading angle associated with the initial camera pose and a heading angle associated with the final camera pose, wherein an animation of the plurality of intermediate images produces a transition of views between the initial camera pose and the final camera pose, and wherein producing each of the plurality of intermediate images comprises:

rendering a first intermediate image based on the initial mesh model;

rendering a second intermediate image based on the final mesh model; and blending the first intermediate image and second intermediate image by assigning a first opacity to the first intermediate image and a second opacity to the second intermediate image, and combining the first intermediate image and the second intermediate image.

18. The system of claim 17, wherein each of the initial and final depthmaps comprises a plurality of pixels, and wherein each pixel of the depthmap comprises a depth value associated with the respective initial image or final image.

* * * * *